United States Patent Office 3,096,251
Patented July 2, 1963

3,096,251
METHOD OF STABILIZING ACID PHOSPHATASE IN SERUM BY MEANS OF CITRATES AND GLUTAMATES
Arthur L. Babson, Morris Plains, N.J., assignor to Warner-Lambert Pharmaceutical Company, Morris Plains, N.J., a corporation of Delaware
No Drawing. Filed Mar. 10, 1961, Ser. No. 94,719
1 Claim. (Cl. 167—84.5)

The present invention relates to a new and novel method of stabilizing the enzyme acid phosphatase in blood serum and to a composition particularly useful in such stabilization.

The enzyme acid phosphatase, which has the ability to hydrolyze phosphate esters in an acid medium, is normally present in the prostate gland of humans. In cancer of the prostate, this enzyme is released into the blood serum with a resulting increase in the serum acid phosphatase concentration several fold above normal values. Thus, the measurement of the concentration of this enzyme in serum is a valuable diagnostic tool in detecting cancer of the prostate.

A serious problem in the utilization of the measurement of acid phosphatase in serum as a diagnostic aid is due to the instability of this enzyme in blood serum at the pH values which such serum attains shortly after collection. For example, in blood serum at pH 8.25, only 60 percent of the initial acid phosphatase activity remains at the end of two hours. At pH 8.46, the activity after two hours is only 30 percent of the initial activity. Such activity losses can have serious diagnostic consequences since a belated analysis may fail to reveal an abnormal concentration and thus early diagnosis of a cancerous condition may be overlooked.

The normal work load in biochemical laboratories which routinely analyze various body fluids for purposes of diagnosis is such that it frequently becomes extremely inconvenient, if not impossible, to analyze all samples as soon as they are received. There has long been a need for a method of stabilizing the enzyme acid phosphatase in serum to insure that accurate measuremnts may be obtained, even if the analysis is not carried out immediately after the serum is collected. Moreover, an effective stabilization means would prove extremely valuable in utilizing acid phosphatase measurement as an accurate diagnostic tool in screening large population groups. In such a screen, serum samples could be taken throughout the day from large numbers of people and the samples then analyzed at one time. This is not possible at present in view of the instability of acid phosphatase in serum as described above.

It is, therefore, a primary object of this invention to provide both a method for stabilizing acid phosphatase in serum and a composition to effect such stabilization so that the acid phosphatase concentration in the stabilized serum will remain constant for long periods of time to insure accuracy of results.

Other objects and the advantages of the present invention will become apparent from the following detailed description.

I have now found that acid phosphatase in serum may be stabilized by the addition to freshly collected serum of a composition comprising an acid buffering material selected from the group consisting of disodium citrate, those mixtures which form disodium citrate in aqueous solution, and a mixture of L-glutamic acid and sodium glutamate. The addition of such a composition to freshly drawn serum results in the stabilization of the acid phosphatase enzyme present therein without any significant volume change and dilution of the enzyme. Serum so stabilized may be stored from as long as one week even at room temperatures without change in the acid phosphatase concentration.

The particular acid buffering materials employed in accordance with my invention are critical. I have found that effective stabilization is obtained by the use of either disodium citrate or a mixture of L-glutamic acid and sodium glutamate. In place of disodium citrate itself, the composition may, alternately, contain mixtures which in aqueous solution will form disodium citrate, such as a mixture of citric acid and trisodium citrate. In accordance with a preferred embodiment of my invention, the acid buffering materials as described above are combined with conventional lubricants such as leucine, polyethylene glycols and the like and the resulting composition compressed into tablet form. Inert fillers such as sucros, lactose and the like may also be present. I have found that the stabilizing compositions of my invention should preferably contain between 15 and 35 milligrams of the acid buffering material which, when combined with tablet excipients as described above, results in the formation of tablets weighing about 20 to about 40 milligrams. Such compositions effectively stabilize 2 ml. of serum, which is the normal volume of serum collected for analysis of acid phosphatase concentration.

The criticality of the above acid buffering materials employed in accordance with this invention is established by the fact that tartrate, oxalate and phosphate buffers which generally have the same effect upon pH values in aqueous solution as do the preferred buffers described above are not effective in the stabilization of the acid phosphatase enzyme. I have found that dry preparations comprising disodium citrate are preferred.

The following examples are included in order further to illustrate the present invention:

*Example I*

The following ingredients are blended in the proportions indicated.

| Ingredient: | Weight (grams) |
|---|---|
| Disodium citrate | 19 |
| Lactose | 7 |
| L-leucine | 2 |

The blend is compressed into tablets each weighing 28 milligrams. The addition of one tablet prepared as described above to a quantity of 2 ml. freshly collected blood serum results in effective stabilization of acid phosphatase for at least one week.

*Example II*

The following ingredients are blended in the proportions indicated.

| Ingredient: | Weight (grams) |
|---|---|
| Citric acid, anhydrous | 5.15 |
| Trisodium citrate, anhydrous | 13.85 |
| Lactose | 7 |
| L-leucine | 2 |

The blend is compressed into 28 milligram tablets and is used as described in Example I with similar results.

*Example III*

The following ingredients are blended in the proportions indicated.

| Ingredient: | Weight (grams) |
|---|---|
| L-glutamic acid | 10 |
| Monosodium glutamate | 20 |
| L-leucine | 2 |

The blend is compressed into 32 milligram tablets and is used as described in Example I with similar results.

It is understood that the foregoing detailed description is given merely by way of illustration and that many variations may be made therein without departing from the spirit of my invention.

Having described my invention, what I desire to secure by Letters Patent is:

A method of stabilizing acid phosphatase in blood serum which comprises the addition to said serum of a member selected from the group consisting of disodium citrate, mixtures of citric acid and trisodium citrate, and mixtures of L-glutamic acid and sodium glutamate in an amount of about 15 to about 35 milligrams of said member for each 2 milliliters of said serum.

References Cited in the file of this patent

Hawk et al.: Physiol. Chem., Blakiston Co., 1947, pp. 411, 578–586, and 21–25.

Wintrobe: Clinical Hematology, 2nd Ed., Lea and Febiger Co., 1949, pp. 310 and 346.

Sventsilskaya: Chem. Abst., vol. 50, p. 10160(f), 1956.

Dobry: Chem. Abst., vol. 52, p. 17538(d), 1958.

Sidoti: The Am. J. of Med. Tech., September-October 1959, pp. 339–340.